3,723,270
PROCESS FOR PRODUCING A COPOLYMER OF TETRAFLUOROETHYLENE AND PROPYLENE USING RADIATION AND A SOLVENT

Yoneho Tabata, Matsudo Chiba, and Gen Kojima, Tokyo, Japan, assignors to Japan Atomic Energy Research Institute, Tokyo, Japan
No Drawing. Filed Dec. 11, 1970, Ser. No. 97,386
Int. Cl. C08d 1/00; C08f 1/16
U.S. Cl. 204—159.22    4 Claims

ABSTRACT OF THE DISCLOSURE

Copolymers of tetrafluoroethylene and propylene are prepared in a non-polymerizable medium of a solvent or swelling agent, using high energy ionizing radiation.

BACKGROUND OF THE INVENTION

Field of the invention

This invention relates to a process for copolymerizing tetrafluoroethylene and propylene, and more particularly to a method for copolymerizing tetrafluoroethylene and propylene with high energy ionizing radiation in the presence of a solvent or swelling agent.

Description of prior art

It has been known to produce copolymers of tetrafluoroethylene and propylene by suspension polymerization of tetrafluoroethylene and propylene in the presence of an organic peroxide catalyst, as disclosed in British Pat. 594,249, or by emulsion polymerization of tetrafluoroethylene and propylene in the presence of a water soluble catalyst, as disclosed in U.S. Pat. 3,467,635. These prior art processes, however, have the disadvantage of requiring high pressures, about 150 kg./cm.$^2$, which necessitates the use of complex and heavy equipment. Moreover, the polymerization reaction rate of these prior art processes is too slow, and the purification of the copolymer is difficult. It has also been known to produce copolymers of tetrafluoroethylene and propylene with high energy ionizing radiation, see Kogyo Kagaku Zasshi 68 (10) 1926–9, to produce a pure product. However, that process also had the disadvantage of a slow polymerization reaction rate, e.g., as low as 0.1% per hour, and a low degree of polymerization. Furthermore, it is quite difficult to remove the heat of reaction from that process so that it is not commercially feasible.

SUMMARY OF THE INVENTION

Accordingly, it is an object of this invention to provide a novel process for obtaining copolymers of tetrafluoroethylene and propylene at high polymerization reaction rates.

It is another object of this invention to provide a novel process for obtaining a relatively pure copolymer of tetrafluoroethylene and propylene at high polymerization reaction rates to form a product having a very narrow distribution of molecular weight.

It is another object of this invention to provide a process for producing a relatively pure copolymer of tetrafluoroethylene and propylene having a very narrow distribution of molecular weight under relatively low pressure and low temperature conditions.

These and other objects have now herein been attained by irradiating a mixture of tetrafluorethylene and propylene with high energy ionizing radiation in a medium containing a solvent or swelling agent for the resulting copolymer.

DETAILED DESCRIPTION OF PREFERRED EMBODIMENTS

The molar ratio of tetrafluoroethylene to propylene can be selected over a wide range. For instance, suitable results are attainable when the molar ratio of tetrafluoroethylene/propylene is from 99/1 to 1/99, preferably 99/1 to 30/70, and especially 95/5 to 50/50. The degree of polymerization and the particular composition of the copolymer, of course, will depend upon the particular molar ratio of the tetrafluoroethylene used. When higher concentrations of tetrafluoroethylene are used, the molecular weight of the resulting copolymer has been found to be sufficiently high and the copolymerization reaction rate has been found to be suitable. Moreover, the solvent resistance of the copolymer is high.

The reaction medium must be selected according to certain specific criteria:

(a) The medium should be capable of accelerating the polymerization reaction rate by initiating the reaction or by accelerating the propagation of the reaction. For example, diethylether or tetrahydrofuran in the reaction medium will result in a copolymerization reaction rate which is substantially the same as that obtainable with conventional processes. That is, the reaction rate will be the same as if no special medium were present at all. Accordingly, these solvents are not suitable for the present invention.

(b) The medium should not hinder the production of free radicals of tetrafluoroethylene or propylene, which is the mechanism for the radiation copolymerization reaction. For example, the use of benzene or toluene will retard the formation of free radicals, thereby resulting in a lower copolymer yield.

(c) The medium should not be chain transferable with tetrafluoroethylene or propylene under the action of high energy ionizing radiation, since the molecular weight of the resulting copolymer will be decreased thereby possibly resulting in a liquid copolymer. Chloroform, carbon tetrachloride and dichloroethane each possess chain transfer properties and accordingly should not be used in the reaction medium.

(d) The medium should be a liquid under the reaction conditions.

(e) The medium should dissolve at least one monomer, either the tetrafluoroethylene or the propylene, to yield a homogeneous copolymerization reaction system. For example t-butanol will dissolve only propylene, but fluorohydrocarbons and fluorochlorohydrocarbons will dissolve both tetrafluoroethylene and propylene.

(f) The medium should be either a swelling agent or a solvent for the resulting copolymer, but should be non-polymerizable under the reaction conditions. Fluorohydrocarbons or fluorochlorohydrocarbons are good solvents and t-butanol is an acceptable solvent, although weak.

(g) The medium should have a boiling point of between −10° C. to +100° C.

When the reaction medium is selected using the above criteria, a high molecular weight copolymer having a narrow distribution of molecular weight can be effectively produced at a high rate of copolymerization. Moreover, a homogeneous copolymerization reaction system is obtained which provides a higher degree of reproducibility.

Fluorohydrocarbons and fluorochlorohydrocarbons containing 1 to 4 carbon atoms, have been found to be especially suitable mediums for the present invention. Suitable mediums include the chlorofluorohydrocarbons, such as monofluorotrichloromethane, trifluorotrichloroethane, tetrafluorodichloroethane; fluorohydrocarbons, such as perfluorocyclobutane. n-Butanol and t-butanol can also be used as the medium, although the molecular weight distribution of the resulting copolymer will be a little broader compared with that obtained when copolymerization is effected in the presence of a chlorofluorohydrocarbon or a fluorohydrocarbon. n-Butanol and t-butanol can dissolve the monomers, but they will only slightly swell the resulting copolymer. Although tetrahydrofuran is a good solvent for the copolymer, it has an adverse effect in blocking the copolymerization reaction and hence is unsuitable. Likewise, benzene tends to deactivate the copolymerization reaction, and accordingly is likewise not suitable.

The molar ratio of the monomers to the medium depends upon the particular medium, reaction temperature, molar ratio of tetrafluroethylene to propylene and type of apparatus used. Good results are obtainable when the molar ratio of monomer to medium is between 1/10 to 10/1 and preferably between 1/5 to 10/1. Most preferably, best results are obtainable when the molar ratio is between 1/2 to 6/1. The molar ratio of the monomers to the medium will affect the rate of copolymerization reaction, the molecular weight and the distribution of the molecular weight. In general, however, it will not affect the ratio of $C_2F_4/C_3H_6$ in the resulting copolymer.

Any type of high energy ionizing radiation can be used to effect the copolymerization reaction. For instance, $\gamma$-rays, X-rays, $\alpha$-rays, $\beta$-rays, or electron rays may be used. The dose rate of the ionizing radiation may be between $10^2$–$10^6$ roentgens per hour and preferably $10^3$–$10^5$ roentgens per hour. In general, when a high dose rate is used, the copolymerization reaction rate will be high, but the molecular weight of the resulting copolymer will be low. The temperature of the copolymerization reaction is not critical and can be carried out within a range of from $-40°$ C. to $+150°$ C., and preferably $-20°$ C. to $+100°$ C.

The pressure of the reaction can be lower than those of conventional processes. Good results are obtainable when the pressure is less than 100 kg./cm.$^2$, preferably 1 to 50 kg./cm.$^2$, and most preferably between 5 to 30 kg./cm.$^2$.

One of the advantages of the present invention is that a very narrow distribution of the molecular weight is obtained. To this end, the following conditions should be observed:

(a) Molar ratio of $C_2F_4/C_3H_6$: The distribution of the molecular weight will be broadened if the quantity of tetrafluoroethylene is too high.

(b) Ratio of $M/S$ (monomers/medium): The distribution of the molecular weight will be broadened if the ratio of $M/S$ is more than 50/50.

(c) Dose rate. The distribution of molecular weight will be narrowed if the dose rate of irradiation is between $10^2$ to $10^6$ roentgens per hour.

(d) Reaction period: The distribution of molecular weight will be broadened if the reaction period is too long.

In the process of this invention, tetrafluoroethylene and propylene are respectively charged to a reactor at a predetermined ratio from pressurized containers. The medium is charged to the reactor system and the contents of the reactor are repeatedly solidified and de-aired. In commercial scale, the autoclave is de-aired by purging with nitrogen gas.

The mixture is then irradiated with high energy ionizing radiation at a predetermined dose rate for a suitable period of time. The resulting copolymer of tetrafluoroethylene and propylene is obtained by discharging the unreacted monomer and the medium as a gas and by drying the medium using vacuum techniques.

If preferable, the resulting product can be purified by dissolving in a solvent such as tetrahydrofuran and precipitating from methanol.

The reaction is usually effected under relatively low pressures, such as 10 atmospheres, although the reaction mixture should be in a liquid phase.

The copolymerization of the present invention is very advantageous for commercial adaptation for a number of reasons. The copolymerization reaction rate is quite high and the inherent viscosity of the resulting copolymer is high. The reaction temperature is quite easily controlled since heat is rapidly removed through the medium. The reaction can also be effected over a wide temperature range of from $-40°$ C. to $150°$ C., although it is usual to effect the reaction at about $0°$ C. Purification of the resulting product is not difficult, and the properties of the copolymer can be easily altered by selecting the molar ratio of tetrafluoroethylene to propylene. The molecular weight distribution of the copolymer can be easily controlled by controlling the radiation dose rate.

Having generally described the invention, a further understanding can be attained by reference to certain specific Examples which are provided herein for purposes of illustration only and are not intended to be limiting in any manner.

EXAMPLE 1

21.4 g. of tetrafluoroethylene, 5.1 g. of propylene, and 63.7 g. of trifluorotrichloroethane were charged into an autoclave made of stainless steel and having a volume of 100 cc. The air was removed by repeated melting-solidifying-evacuating and the autoclave was cooled with ice water to a temperature of $0°$ C. $\gamma$-rays from a source of cobalt 60 was used to irradiate the mixture and was applied at a dose rate of $3.0 \times 10^5$ roentgens/hour for 5 hours. Unreacted monomer was discharged with the trifluorotrichloroethane and 10.3 g. of a copolymer of tetrafluoroethylene and propylene was obtained. The polymerization reaction rate was 7.8%/hr., and the tetrafluoroethylene content in the copolymer was 49 mole percent. The inherent viscosity of the copolymer in tetrahydrofuran solution (100 cc./g.) at $30°$ C. was 0.19.

Reference Example 1

The process of Example 1 was repeated except using 74.4 g. of tetrafluoorethylene, 15.6 g. of propylene. No medium was included during irradiation. The mixture was irradiated for 10 hours and 19.1 g. of tetrafluoroethylene-propylene copolymer was obtained. The copolymer was found to contain 49 mole percent tetrafluorethylene. The polymerization reaction rate, however, was only 1.9%/hour, and the inherent viscosity in tetrahydrofuran (100 cc./g.) at $30°$ C. was 0.12.

EXAMPLES 2–8

Tetrafluoroethylene, propylene, and reaction medium were charged into a 100 cc. volume autoclave made of stainless steel. Air was released from the reactants by repeated melting-solidifying-deairing and the autoclave was maintained at a specific temperature for further reaction. $\gamma$-rays from a cobalt 60 source was used to irradiate the mixture. Unreacted monomer was discharged with the medium to obtain the copolymer. The yield, content of tetrafluoroethylene, polymerization reaction rate, and inherent viscosity of the copolymer in tetrahydrofuran, as well as the appearance of the copolymer are stated in Table 1.

TABLE 1

| Example number | Monomer content | | | Medium | | Radiation | | | Yield (g.) | TFE content (percent) | Copolymer polymerization reaction rate (percent hr.) | Inherent viscosity | Mechanical property |
|---|---|---|---|---|---|---|---|---|---|---|---|---|---|
| | TFE [1] (g.) | P [2] (g.) | TFE [1]/P [2] (molar ratio) | Type | Amount (g.) | Dose rate ($\gamma$/hr.) | Temp. (°C.) | Time (hr.) | | | | | |
| 2 | 27.8 | 5.6 | 2/1 | MFTCM | 51.5 | $3.0 \times 10^5$ | 0 | 5 | 12.5 | 49 | 7.5 | 0.18 | |
| 3 | 21.2 | 4.6 | 2/1 | PFCB | 64.0 | $3.0 \times 10^5$ | 0 | 5 | 4.8 | 50 | 3.7 | 0.22 | Rubber-like elasticity. |
| 4 | 21.4 | 5.1 | 2/1 | TFTCE | 63.7 | $3.0 \times 10^5$ | -40 | 5 | 2.6 | 48 | 2.0 | 0.09 | |
| 5 | 21.4 | 5.1 | 2/1 | TFTCE | 63.7 | $3.0 \times 10^5$ | 100 | 1 | 12.8 | 51 | 50.0 | 0.23 | Rubber-like elasticity. |
| 6 | 32.3 | 1.4 | 9/1 | TFTCE | 66.3 | $3.0 \times 10^5$ | 0 | 0.75 | 5.1 | 54 | 20.0 | 0.5 | Do. |
| 7 | 21.4 | 5.1 | 2/1 | TFTCE | 63.7 | $4.4 \times 10^3$ | 0 | 10 | 1.3 | 49 | 0.5 | 0.3 | Do. |
| 8 | 21.4 | 5.1 | 2/0 | t-Butyl alcohol | 48.0 | $4.4 \times 10^3$ | 0 | 10 | 21.2 | 50 | 8.1 | 0.3 | Do. |

[1] TFE = tetrafluoroethylene.
[2] P = propylene
NOTE: MFTCM = monofluorotrichloromethane; PFCB = perfluorocyclobutane; TFTCE = trifluorotrichloroethane:

In order to show the advantages of this invention as compared to the same reaction occurring in the absence of the medium, experimental results both with and without the addition of the medium are shown in Tables 2 and 3.

EXPERIMENT 1

Tetrafluoroethylene and propylene were copolymerized in a 25 cc. ampoule. The conditions of reaction temperature, molar ratio of $C_2F_4/C_3H_6$, molar ratio of monomer to medium, dose rate of $\gamma$-rays and time of irradiation are stated in Table 2. The results of yield in weight percent, number average molecular weight (hereinafter referred to as $\overline{M}n$), weight average molecular weight (hereinafter referred to as $\overline{M}w$), molecular weight distribution (hereinafter referred to as $\overline{M}w/\overline{M}n$), and inherent viscosity of the copolymer in tetrahydrofuran ($[\eta]$) are also shown in Table 2. The molecular weights were measured by gel permeation chromatography (apparatus manufactured by Waters Associates Co.). The molecular weight of the copolymer is preferably greater than 20,000, which corresponds approximately to more than 0.2 of $[\eta]$ inherent viscosity.

$\overline{M}w/\overline{M}n$ shows the distribution of molecular weight. A random distribution would be indicated as $\overline{M}w/\overline{M}n = 2.0$. As shown in Table 2, whenever trifluorotrichloroethane was used, $\overline{M}w/\overline{M}n$ was less than 2.0, which shows a very narrow molecular weight distribution.

When t-butanol was used, $\overline{M}w/\overline{M}n$ was 2.26, which shows a rather broad molecular weight distribution, although the molecular weight itself was quite high. When no medium was used, $\overline{M}w/\overline{M}n$ was quite high, which shows a broad distribution of molecular weight. The resulting copolymer does not dissolve in the monomer, and copolymerization is effected in a two-phase system. On the other hand, when the resulting copolymer is dissolved in the medium, copolymerization occurs in a single-phase system.

EXPERIMENT 2

Tetrafluoroethylene and propylene were copolymerized under $\gamma$-rays in a five liter autoclave.

The conditions of reaction and the results are shown in Table 3.

TABLE 3

| Medium | Temperature (°C.) | $C_2F_4/C_3H_6$ molar ratio | Monomer/medium | Dose rate (r/hr.) | Irradiation time (hrs.) | Yield (weight percent) | $\overline{M}n$ ($\times 10,000$) | $\overline{M}w$ ($\times 10,000$) | $\overline{M}w/\overline{M}n$ | $[\eta]$ |
|---|---|---|---|---|---|---|---|---|---|---|
| TFTCE [1] | 0 | 75/25 | 4 | $5 \times 10^4$ | 20 | 25.8 | 3.4 | 7.3 | 2.17 | 0.42 |
| TFTCE [1] | 0 | 75/25 | 4 | $5 \times 10^4$ | 20 | 34.4 | 3.4 | 7.4 | 2.21 | 0.47 |
| TFTCE [1] | 0 | 75/25 | 4 | $5 \times 10^4$ | 20 | 30.6 | 3.5 | 8.0 | 2.28 | 0.37 |
| TFTCE [1] | 0 | 75/25 | 4 | $5 \times 10^4$ | 8 | 11.2 | 2.7 | 4.7 | 1.76 | 0.33 |
| TFTCE [1] | 0 | 75/25 | 4 | $5 \times 10^4$ | 20 | 36.8 | 3.0 | 6.0 | 2.04 | 0.38 |
| t-Butanol | 0 | 75/25 | 4 | $5 \times 10^4$ | 17 | 17.7 | 2.9 | 7.2 | 2.48 | 0.40 |
| None, medium | 0 | 90/10 | | $4.5 \times 10^4$ | 18 | 7.9 | 0.73 | 3.5 | 4.80 | 0.69 |
| Do | 28 | 66/34 | | $4 \times 10^4$ | 17 | 34.1 | 2.9 | 9.0 | 3.16 | 0.44 |

[1] TFTCE = trifluorotrichloroethane.

EXPERIMENT 3

Tetrafluoroethylene and propylene were copolymerized in a stainless steel autoclave or an ampoule, using high energy $\gamma$-rays. In order to show the effect of molar ratio and ratio of monomers to medium, the following experiments were conducted. In each experiment, trifluorotrichloroethane was used as the reaction medium and the reaction temperature was maintained at 0° C. The dose rate of $\gamma$-rays was $5 \times 10^4$ roentgens/hour.

TABLE 2

| Medium | Temperature (°C.) | $C_2F_4/C_3H_6$ molar ratio | Monomer/medium | Dose rate (r/hr.) | Irradiation time (hrs.) | Yield (weight percent) | $\overline{M}n$ ($\times 10,000$) | $\overline{M}w$ ($\times 10,000$) | $\overline{M}w/\overline{M}n$ | $[\eta]$ |
|---|---|---|---|---|---|---|---|---|---|---|
| TFTCE [1] | 1 | 66/34 | 1 | $5.0 \times 10^4$ | 4.0 | 13.4 | 2.5 | 4.3 | 1.73 | 0.26 |
| TFTCE [1] | 1 | 66/34 | 1 | $5.0 \times 10^4$ | 9.0 | 27.6 | 2.4 | 4.2 | 1.73 | 0.25 |
| TFTCE [1] | 1 | 66/34 | 1 | $5.0 \times 10^4$ | 13.5 | 41.7 | 2.3 | 4.0 | 1.73 | 0.26 |
| TFTCE [1] | 1 | 90/10 | 1 | $5.0 \times 10^4$ | 2.5 | 11.9 | 3.2 | 5.9 | 1.83 | 0.31 |
| TFTCE [1] | 1 | 66/34 | 1 | $2.2 \times 10^4$ | 6.0 | 7.3 | 2.7 | 4.8 | 1.74 | 0.35 |
| TFTCE [1] | 75 | 66/34 | 1 | $5.0 \times 10^4$ | 5.0 | 42.7 | 2.4 | 4.1 | 1.72 | 0.25 |
| TFTCE [1] | 1 | 66/34 | 4 | $5.0 \times 10^4$ | -7.5 | 17.0 | 3.0 | 5.5 | 1.83 | 0.27 |
| TFTCE [1] | 1 | 66/34 | 1 | $3.0 \times 10^5$ | 5.0 | 40.7 | 2.6 | 5.8 | 2.26 | 0.35 |
| t-Butanol | 1 | 66/34 | | $3.0 \times 10^5$ | 10.0 | 14.5 | 2.2 | 6.5 | 2.92 | 0.30 |
| None, medium | -23 | 66/34 | | $3.0 \times 10^5$ | 5.5 | 10.5 | 2.8 | 8.9 | 3.17 | 0.54 |
| Do | -23 | 90/10 | | $3.0 \times 10^5$ | 6.0 | 5.3 | 3.6 | 12.9 | 3.55 | 0.71 |
| Do | -23 | 90/10 | | $6.9 \times 10^4$ | | | | | | |

[1] TFTCE = trifluorotrichloroethane.

TABLE 4

| Number | $C_2F_4/C_3H_6$ | M/S | Irradiation time | Yield (wt. percent) | $\bar{M}n \times 10^{-4}$ | $\bar{M}n \times 10^{-4}$ | $\bar{M}w/\bar{M}n$ | $[\eta]$ | $C_2F_4/C_3H_6$ |
|---|---|---|---|---|---|---|---|---|---|
| 1 | 66/34 | 4 | 8 | 17 | 2.2 | 4.4 | 2.00 | 0.24 | 50/50 |
| 2 | 75/25 | 4 | 20 | 20 | 3.5 | 8.0 | 2.28 | 0.37 | 51/49 |
| 3 | 90/10 | 4 | 5 | 11 | 2.5 | 5.8 | 2.3 | [1] 0.37 | 54/46 |
| 4 | 90/10 | 4 | 10 | 23 | 3.2 | 8.3 | 2.6 | [2] 0.44 | 55/45 |
| 5 | 66/34 | 1/4 | 13 | 36 | 1.8 | 3.2 | 1.8 | 0.20 | 51/49 |
| 6 | 66/34 | 1/1 | 3 | 10 | 2.5 | 4.3 | 1.7 | 0.26 | 50/50 |

[1] $\bar{M}n = 4.6$ (×10,000).
[2] $\bar{M}n = 5.5$ (×10,000).

In Experiments 1, 2, 5, and 6, a 20 cc. ampoule was used as the reactor. In Experiments 3 and 4, a 5 liter autoclave was used as the reactor.

In Experiment 4, propylene monomer was added to the tetrafluoroethylene over a period of 5 hours to obtain the predetermined ratio of $C_2F_4/C_3H_6 = 90/10$. The reaction was continued for 5 additional hours. The value of $\bar{M}n$ measured by gel permeation chromatography was found to be less than the actual value of the weight average molecular weight.

When no reaction medium was used, $\bar{M}w/\bar{M}n$ was found to be quite high, which shows a broad distribution of molecular weight. On the other hand, when trifluorotrichloroethane was added to the medium, $\bar{M}w/\bar{M}n$ was found to be about 2.0, even though the molecular weight was quite high. These results show that a very narrow distribution of molecular weight is obtained.

When t-butanol was used, $\bar{M}w/\bar{M}n$ was found to be 2.48, which is quite low in comparison to the broad distribution of molecular weight which occurs when no medium is used.

Having now fully described the invention, it will be apparent to one of ordinary skill in the art that many changes and modifications can be made without departing from the spirit or scope of the invention.

Accordingly, what is claimed as new and desired to be secured by Letters Patent of the United States is:

1. In a process for producing copolymers of tetrafluoroethylene and propylene whereby tetrafluoroethylene is copolymerized with propylene and high energy ionizing radiation, the improvement comprising effecting said reaction in a medium selected from the group consisting of a chlorofluorohydrocarbon and fluorohydrocarbon, which is non-polymerizable, which is capable of accelerating the rate of the copolymerization reaction, which will not prevent the formation of free radicals, which is characterized by a low chain transfer action and which is capable of dissolving at least one of the monomers and swelling or dissolving the resulting copolymer, wherein the reaction is effected at a temperature of $-40°$ to $+150°$ C., a pressure of 1 to 50 kg./cm.$^2$ and wherein the molar ratio of tetrafluoroethylene/propylene is from 99/1 to 1/99.

2. The process of claim 1, wherein the molar ratio of said tetrafluoroethylene and propylene monomers to said non-polymerizable medium is 1/10 to 10/1.

3. The process of claim 1, wherein the molar ratio of said monomers of tetrafluoroethylene and propylene to said non-polymerizable medium is 1/2 to 6/1.

4. The process of claim 1, wherein the molar ratio of tetrafluoroethylene to propylene is 95/5 to 50/50.

References Cited

UNITED STATES PATENTS

| 3,437,648 | 4/1969 | Dietrich | 260—85.3 R |
| 3,467,635 | 9/1969 | Brasen et al. | 260—80.76 |
| 3,058,899 | 10/1962 | Yanko et al. | 204—159.22 |
| 3,342,777 | 9/1967 | Howard, Jr. | 204—159.22 |

OTHER REFERENCES

Radiation Induced Copolymerization of TFE with Propylene at Low Temperature, Tabata et al.: J. of Polymer Science, Part A, vol. 2, pp. 2235–2243 (1964).

MURRAY TILLMAN, Primary Examiner

R. B. TURER, Assistant Examiner

U.S. Cl. X.R.

260—92.1